March 1, 1938.   G. A. NEALON   2,109,781
SIPHON DEVICE
Original Filed Aug. 19, 1935
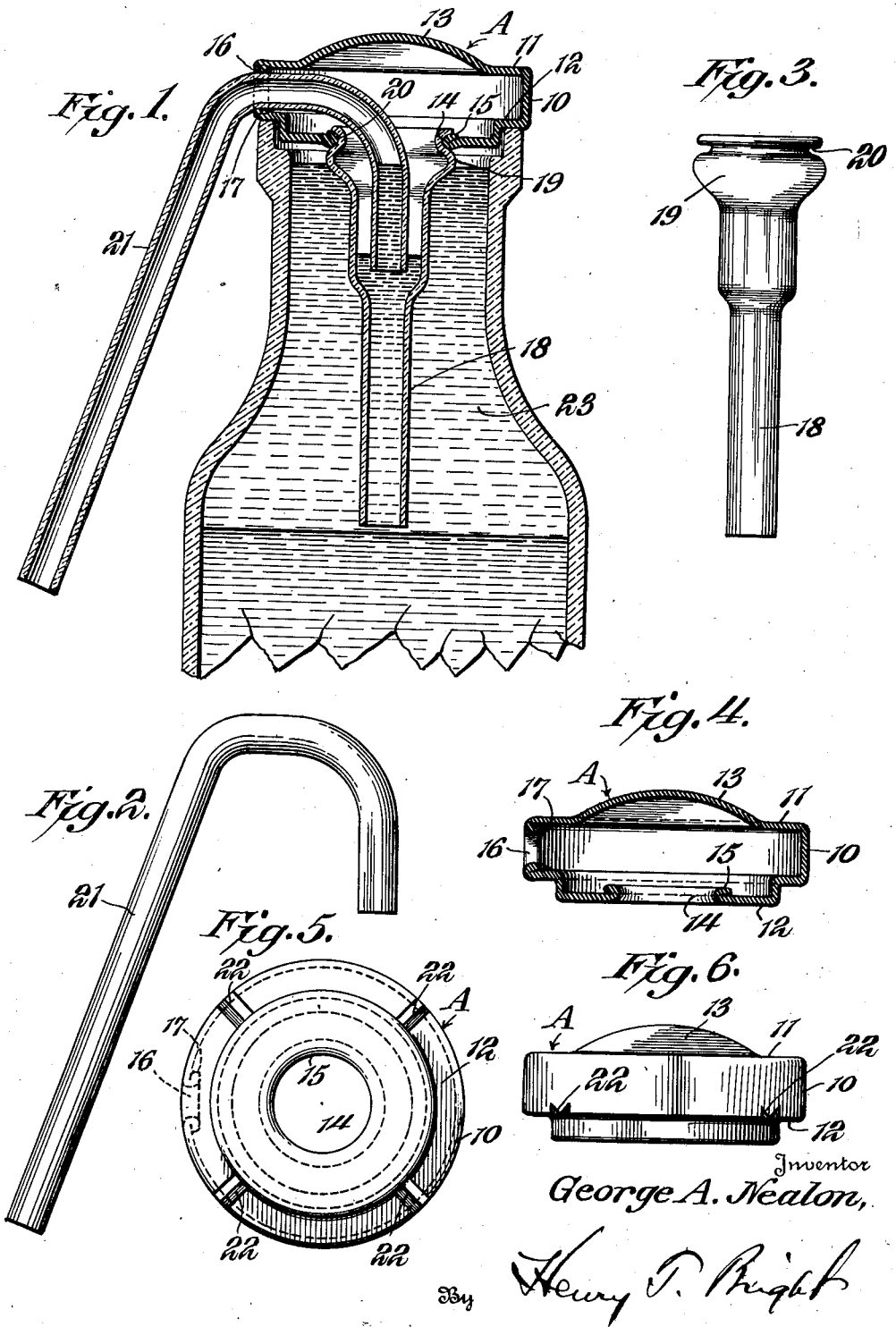
Inventor
George A. Nealon,
By Henry T. Bright
Attorney

UNITED STATES PATENT OFFICE 2,109,781

SIPHON DEVICE

George A. Nealon, Indianhead, Md.; L. Agnes Nealon administratrix of said George A. Nealon, deceased Application August 19, 1935, Serial No. 36,921
Renewed August 10, 1937

7 Claims. (Cl. 137—20)

My invention relates to siphon devices and particularly to a type for removing liquid from containers.

It is the purpose of my invention to provide a device of the type specified which will be effective and reliable in use, durable, and cheap to manufacture.

Furthermore, it is the purpose of my present invention to so construct the device that the parts thereof which contact the liquid during operation can be easily detached from the remainder of the device for sterilization and as easily assembled with said remainder after sterilization.

I will describe my invention in the best form known to me at present and in connection with the removal of the upper layer of cream from a milk bottle, but it will be understood that the same is susceptible to changes in forms and proportions and to other uses than that specifically shown herein without departing from the spirit of my invention.

In the drawing chosen to illustrate my invention, the scope whereof is set forth in the appended claims:

Figure 1 is a vertical section of the upper portion of a milk bottle with my invention applied and also shown in vertical section;

Figure 2, a detail elevation of the siphon tube;

Figure 3, a detail elevation of an additional tube of my invention;

Figure 4, a detail section of the compressible cap embodied in my invention;

Figure 5, a bottom plan view of the compressible cap, and

Figure 6, a detail elevation of the compressible cap.

Referring to the drawing my invention is shown as comprising a hollow rubber cap A which includes a cylindrical side wall 10, a top wall 11 and bottom wall 12. The top 11 has a dome formation 13 disposed centrally thereof. An axial hole or opening 14 is provided in the bottom 12 and the material of the bottom around the opening is rolled as shown at 15 to increase the sturdiness of the material of the bottom at that location. A hole or opening 16 is provided in the side wall 10 and the material of the wall around this opening is rolled as at 17. Detachably engaged in the opening 14 is one end of a tube 18. This tube has the end 19 thereof adjacent the bottom 12 enlarged and provided with a circumscribing groove 20 which receives the rolled edge 15 to thereby provide an air tight interfit between the tube and bottom. A siphon tube 21 is detachably engaged through the hole 16 and passes through the interior of the cap A and into the bore of the enlarged end 19 of tube 18 as shown. The diameter of the hole 16 is slightly less than the external diameter of the siphon tube 21 so that an airtight fit is provided between the side wall 10 and the siphon tube. The outer face of the bottom 12 is provided with radial grooves 22 for a purpose that will presently appear.

In use my device is placed in the mouth of the milk bottle in the manner shown in Figure 1. When so applied the outer end of the tube 18 will be located slightly above the bottom of the cream layer, which latter is indicated at 23. The top of the cream layer 23 surrounding the tube 18 will be at the same level as the cream in the siphon tube 21 but the cream in tube 18 will be at a lower level as shown due to the fact that when the cream passes the inner end of the siphon tube the bore of the tube 18 above that point is sealed against communication with the atmosphere. With this status existing a sharp compression of the dome 13 will lift the cream in the siphon tube over the elbow thereof and institute the operation of the device and such operation will continue until the level of the cream falls below the outer end of the tube 18 for reasons well known to those skilled in the art. During movement of the cream through the siphon tube 21 the grooves 22 coact with the edge of the mouth of the milk bottle to provide passages through which air passes into the bottle as the level of the cream drops.

It will be apparent that my device provides for the ready detachment of the tube 18 and the siphon tube 21 from the cap A for purposes of cleaning and sterilization and likewise for easy assembly of said tubes with the cap after they have been cleaned and sterilized.

I claim:

1. A siphon device for withdrawing liquid from a container comprising a hollow resilient compressible cap adapted to seat upon a container and cover the mouth thereof, means for allowing air to pass into a container at a point between the cap and said container when said cap is seated upon the container in covering relation to its mouth, a tube depending axially from the bottom of the cap and having its bore in communication with the interior of the cap, said tube having its bore adjacent the cap enlarged, and a siphon tube having a portion extending through the cap and into the enlarged portion of the bore of the first tube.

2. A siphon device for withdrawing liquid from a container comprising a hollow resilient compressible cap adapted to seat upon a container and cover the mouth thereof, means for allowing air to pass into a container at a point between the cap and said contatiner when said cap is seated upon the container in covering relation to its mouth, a tube having one end detachably connected to the bottom of the cap and depending axially from said bottom, said tube having its bore in communication with the interior of the cap with said bore having an enlarged portion adjacent the cap, and a siphon tube detachably engaged through the wall of the cap and extending into the enlarged portion of the bore of the first tube.

3. A siphon device for withdrawing liquid from a container comprising a hollow resilient compressible cap adapted to seat upon a container and cover the mouth thereof, means for allowing air to pass into a container at a point between the cap and said container when said cap is seated upon the container in covering relation to its mouth, the bottom of said cap having an axial opening, a tube having a circumscribing groove adjacent one end for receiving the portion of the cap bottom surrounding said axial opening to thereby detachably connect the tube and cap, said tube having its bore adjacent the cap enlarged, and a siphon tube detachably engaged through the wall of the cap and extending into the enlarged portion of the bore of the first tube.

4. A siphon device for withdrawing liquid from a container comprising a hollow resilient compressible cap of substantially cylindrical form and adapted to seat at one end upon a container and cover the mouth thereof, the bottom of said cap having an axial opening and radial grooves in its outer face providing passages, when the cap is seated upon a container and overlying the mouth thereof, connecting the interior of said container with the atmosphere, a tube having one end detachably engaged in the bottom opening of the cap, and a siphon tube engaged through the side wall of the cap and extending into the first tube.

5. A siphon device for withdrawing liquid from a container comprising a hollow resilient compressible cap adapted to seat upon a container and cover the mouth thereof, a tube depending axially from the bottom of the cap and having its bore in communication with the interior of the cap, said tube having its bore adjacent the cap enlarged, and a siphon tube having a portion extending through the cap and into the enlarged portion of the bore of the first tube and terminating inwardly of the outer end of said first tube.

6. A siphon device for withdrawing liquid from a container comprising a hollow resilient compressible cap adapted to seat upon a container and cover the mouth thereof, a tube having one end detachably connected to the bottom of the cap and depending axially from said bottom, said tube having its bore in communication with the interior of the cap with said bore having an enlarged portion adjacent the cap, and a siphon tube detachably engaged through the wall of the cap and extending into the enlarged portion of the bore of the first tube.

7. A siphon device for withdrawing liquid from a container comprising a hollow resilient compressible cap adapted to seat upon a container and cover the mouth thereof, the bottom of said cap having an axial opening, a tube having a circumscribing groove adjacent one end for receiving the portion of the cap bottom surrounding said axial opening to thereby detachably connect the tube and cap, said tube having its bore adjacent the cap enlarged, and a siphon tube detachably engaged through the wall of the cap and extending into the enlarged portion of the bore of the first tube.

GEORGE A. NEALON.